Aug. 31, 1926. 1,598,530
F. KOCH
SIDE BEARING
Filed Jan. 20, 1925 3 Sheets-Sheet 2

Aug. 31, 1926.  
F. KOCH  
SIDE BEARING  
Filed Jan. 20, 1925  
1,598,530  
3 Sheets-Sheet 3

Inventor  
Felix Koch,

Witnesses  
Colman F. Zaitz  
Kathleen Kleber

By  
Attorney

Patented Aug. 31, 1926.

1,598,530

UNITED STATES PATENT OFFICE.

FELIX KOCH, OF PITTSBURGH, PENNSYLVANIA, ASSIGNOR TO PRESSED STEEL CAR COMPANY, OF PITTSBURGH, PENNSYLVANIA, A CORPORATION OF NEW JERSEY.

SIDE BEARING.

Application filed January 20, 1925. Serial No. 3,634.

This invention relates to railway cars and particularly to railway cars of the articulated unit type, in which each unit comprises a plurality of car bodies, the adjacent ends of two of which are carried by a single truck, and has for an object the provision of side supports or bearings between the truck and the adjacent ends of two of the bodies of a car unit.

Another object of the invention is to provide a side bearing for an articulated car unit which is capable of universal movement.

Another object of the invention is to provide a side bearing for an articulated car unit which is yieldably mounted and capable of universal movement.

A further object of the invention is to provide a side bearing for an articulated car unit, such bearing having spaced shoe members yieldably mounted on a truck, each of said shoe members being universally movable and adapted to engage with one end of one of the bodies of said car.

These and other objects will be apparent from the following description.

Figure 1:
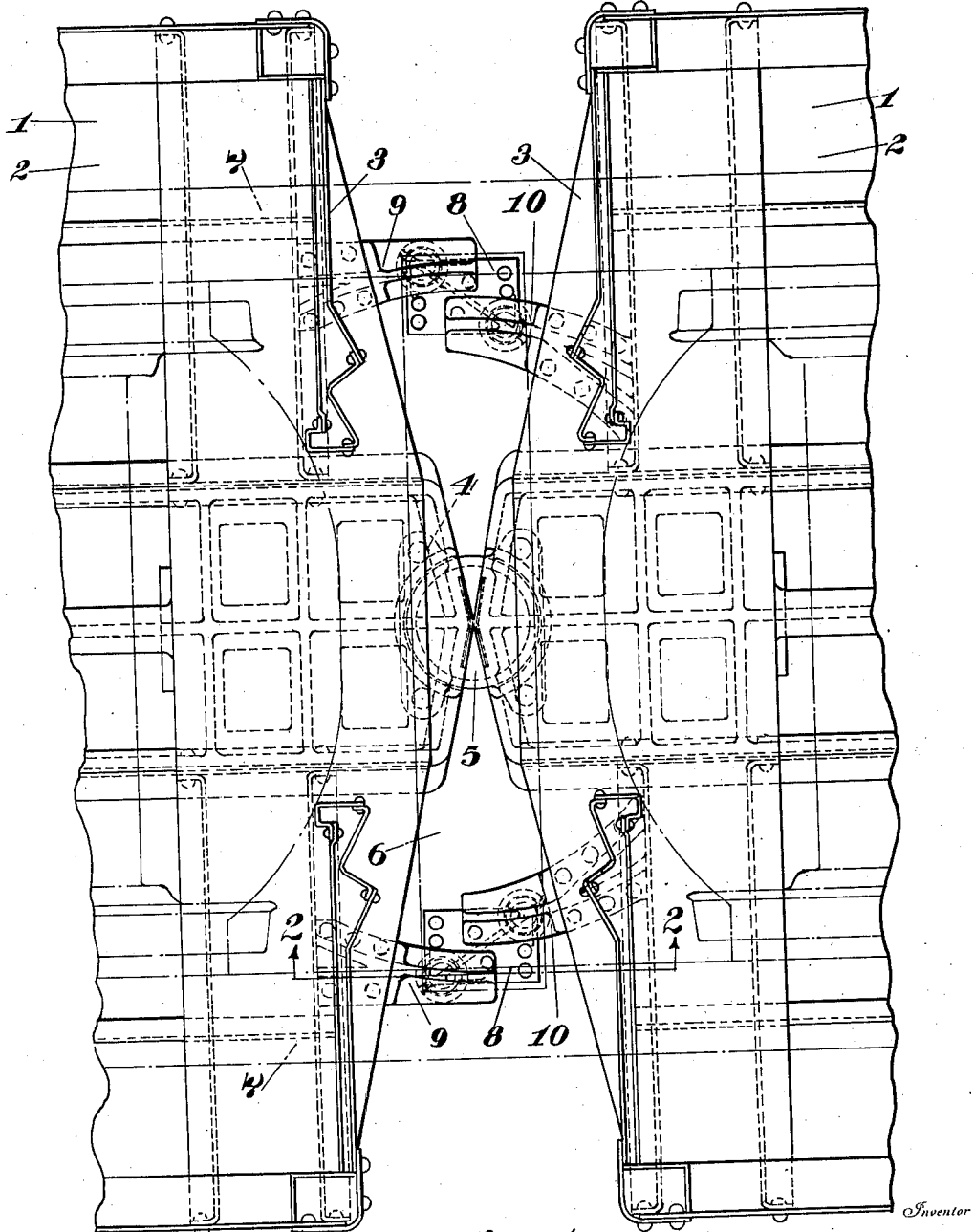
Figure 2:
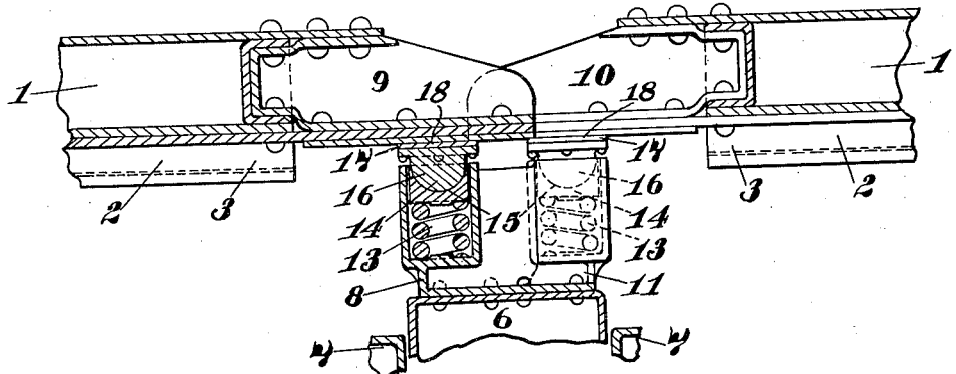
Figure 3:
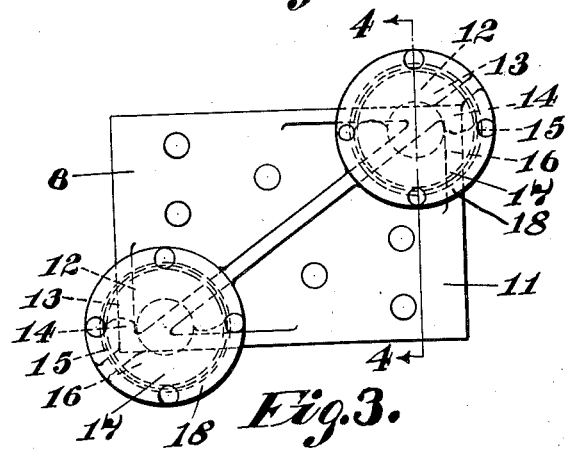
Figure 4:
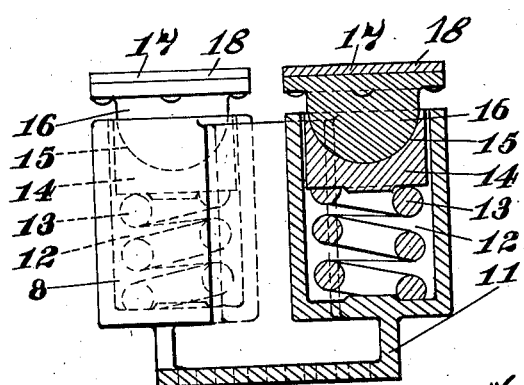
Figure 5:
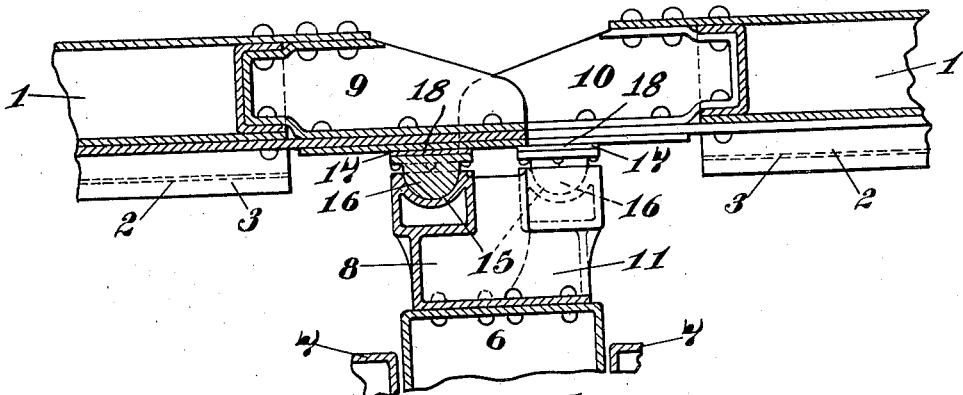
Figure 6:
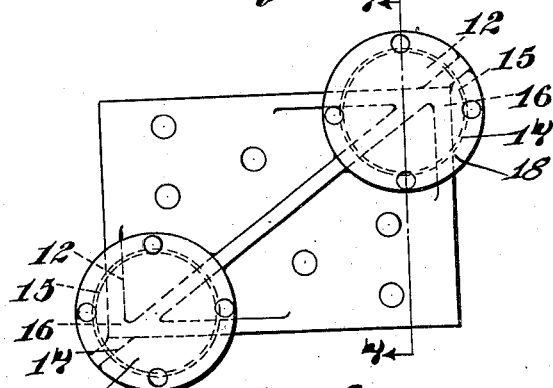
Figure 7:
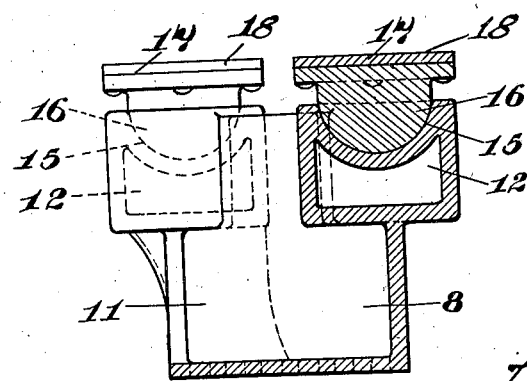

Referring to the drawings in which like reference characters refer to like parts, Fig. 1 is a plan view of portions of the adjacent ends of two car bodies of the articulated car unit; Fig. 2 is a longitudinal sectional view of the same, taken on the line 2—2 of Fig. 1; Fig. 3 is an enlarged detail view of the truck side bearing; Fig. 4 is a sectional view of the same, taken on the line 4—4 of Fig. 3; Fig. 5 is a sectional view of a modification of the invention taken on the line 2—2 of Fig. 1; Fig. 6 is an enlarged detail view of a modification of the truck side bearing and Fig. 7 is a sectional view of the same taken on the line 7—7 of Fig. 6.

Referring now in detail to the drawings the reference character 1 indicates an articulated car unit which comprises a plurality of car bodies 2, the adjacent end portions 3 of two of which have been shown in the drawings. These ends 3 are provided with body center plates 4, both of which engage a truck center plate 5 mounted on a truck bolster 6, which bolster is a part of the truck 7. These center plates 4 and 5 are so formed that they engage with each other in such a manner as to permit the bodies 3 of the unit to move freely relative to each other and to the truck as the car unit rounds a curve or when the bodies sway from side to side. On each side of the longitudinal center line of the truck 7 a truck side bearing 8 is provided, which is secured preferably to the top of the bolster 6.

Above the truck side bearings each of the adjacent ends 3 of adjacent underframes is provided with body side bearings, which extend outwardly from such ends and are adapted to engage with the truck side bearings. These body side bearings are indicated by the reference characters 9 and 10, the side bearings 9 being secured to the end portion of one of the bodies and the side bearings 10 being secured to the end portion of the adjacent body. These side bearings 9 and 10 are preferably of such a length that they overlap each other and are so formed and spaced transversely of the body that they do not contact with each other as the bodies swivel.

Each of the truck side bearings 8 comprises a member 11 which is secured to the bolster 6 and extends upwardly therefrom. In the upper portion of this member spaced recesses or pockets 12 are provided which open upwardly. Within each of these pockets a spring 13 is seated, and upon the upper end of this spring and within the pocket a member 14 is movably mounted. This member has a recess or pocket 15 formed in its upper part which recess is for the reception of the lower semi-spherical portion 16 of a shoe member 17, the upper portion 18 of such member being preferably flat forming a bearing surface which is adapted to engage with one of the body side bearings. The portion 16 of this shoe is movably mounted in the recess 15 and forms a bearing which will permit universal movement of the shoe member in a substantially horizontal plane, thus insuring the proper engagement between the body and truck side bearings at all times and under all service conditions.

In Figs. 5, 6 and 7 a modification of the invention has been illustrated in which the spring 13 and movable member 14 are omitted. In this modification the pocket or recess 15 is formed in the member 11 and the semi-spherical portion 16 of the member 17 is movably mounted therein. The operation of the shoe members is substantially the same as the shoe member in the form shown in Figs. 1 to 4 inclusive.

It will be apparent to those skilled in the art to which this invention appertains that changes may be made in the details of the invention without departing from the spirit and scope of the appended claims.

Having thus described the invention what I claim as new and desire to secure by Letters Patent is:—

1. In a railway car comprising a plurality of connected bodies, a truck for supporting the adjacent ends of two of said bodies, side bearings mounted on said ends, side bearings on said truck capable of universal movement and adapted to engage with the first mentioned side bearings.

2. In a railway car comprising a plurality of connected bodies, a truck for supporting the adjacent ends of two of said bodies, a side bearing on each of said ends, and a side bearing on said truck adapted to engage with said bearings and be movable universally in a horizontal plane thereby.

3. In a railway car comprising a plurality of bodies, a truck, side bearings mounted on the adjacent ends of two of said bodies, and universally movable side bearings on said truck adapted to be engaged by the first mentioned bearings.

4. In a railway car comprising a plurality of bodies, a truck for said car, and universally movable side bearing means between said bodies and truck.

5. In a railway car comprising a plurality of bodies, a truck, and side bearing means between said bodies and truck, said means comprising a plurality of universally movable shoe members.

6. In a railway car comprising a plurality of bodies, a truck beneath the adjacent ends of two of said bodies, side bearings on said ends and side bearings on said truck adapted to be engaged by the first mentioned bearings, each of the side bearings on said truck comprising a universally movable shoe member.

7. In a railway car comprising a plurality of bodies, a truck supporting and connecting the adjacent ends of two of said bodies, and side bearing means, movable universally in a horizontal plane between said ends and body, each of said means comprising a body side bearing and a truck side bearing.

8. In a railway car comprising a plurality of bodies, a truck supporting the adjacent ends of two of said bodies, and universally movable side bearing means interposed between said bodies and truck.

9. In a railway car comprising a plurality of bodies, a truck supporting the adjacent ends of two of said bodies, and yieldable and universally movable side bearing means interposed between.

10. In a railway car comprising a plurality of bodies, a truck supporting the adjacent ends of two of said bodies, and side bearings on said truck adapted to engage with said ends, each of said bearings comprising a base portion, and shoe members mounted therein to move universally in a horizontal plane.

11. In a railway car comprising a plurality of bodies, a truck supporting the adjacent ends of two of said bodies, and side bearings on said truck, each of said side bearings comprising a universally movable shoe member adapted to be engaged by one of said ends.

12. In a railway car comprising a plurality of bodies, a truck supporting the adjacent ends of two of said bodies, and yieldable and universally movable side bearing means between said bodies and truck.

13. In a side bearing for articulated cars, a base portion having a recess formed therein, resilient means in said recess, a member mounted on said resilient member, said member having a recess formed therein, and a shoe member movably mounted in said recess.

14. In a side bearing for articulated cars, a base portion and a shoe member mounted in said base portion and adapted to move universally in a substantially horizontal plane.

15. In a side bearing for articulated cars, a base portion and a shoe member yieldably mounted in said base portion and adapted to move universally.

In testimony whereof, I affix my signature.

FELIX KOCH.